US009853708B2

(12) United States Patent
Lacey

(10) Patent No.: US 9,853,708 B2
(45) Date of Patent: Dec. 26, 2017

(54) WIRING DEVICE WITH INTEGRATED WIRELESS SIGNAL EXTENDER

(71) Applicant: Darron Kirby Lacey, Fayetteville, GA (US)

(72) Inventor: Darron Kirby Lacey, Fayetteville, GA (US)

(73) Assignee: Cooper Technologies Company, Houston, TX (US)

( * ) Notice: Subject to any disclaimer, the term of this patent is extended or adjusted under 35 U.S.C. 154(b) by 364 days.

(21) Appl. No.: 14/163,212

(22) Filed: Jan. 24, 2014

(65) Prior Publication Data

US 2015/0215027 A1    Jul. 30, 2015

(51) Int. Cl.
*H04B 7/155*    (2006.01)

(52) U.S. Cl.
CPC ............... *H04B 7/15507* (2013.01)

(58) Field of Classification Search
CPC .... H04B 1/3877; H04B 7/15507; H04B 1/02; H04B 1/03; H04W 16/26
See application file for complete search history.

(56) References Cited

U.S. PATENT DOCUMENTS

| | | | | |
|---|---|---|---|---|
| 7,324,824 B2 * | 1/2008 | Smith | ............. | H04B 3/542 455/128 |
| 2004/0073597 A1 * | 4/2004 | Caveney | ............. | H04L 12/10 709/200 |
| 2005/0245127 A1 * | 11/2005 | Nordin | ............. | H04Q 1/14 439/540.1 |
| 2005/0265482 A1 * | 12/2005 | Peek | ............. | H04B 1/3877 375/316 |
| 2006/0063508 A1 * | 3/2006 | He | ............. | H03F 3/24 455/341 |
| 2007/0141869 A1 * | 6/2007 | McNeely | ............. | A61B 5/0006 439/76.1 |
| 2010/0177660 A1 * | 7/2010 | Essinger | ............. | H04W 4/001 370/254 |
| 2010/0177750 A1 * | 7/2010 | Essinger | ............. | H04L 67/12 370/338 |
| 2011/0121654 A1 * | 5/2011 | Recker | ............. | H02J 9/065 307/66 |
| 2014/0062297 A1 * | 3/2014 | Bora | ............. | H05B 33/0863 315/34 |

(Continued)

FOREIGN PATENT DOCUMENTS

JP    2007088638 A    *    4/2007

*Primary Examiner* — Hassan Kizou
*Assistant Examiner* — Deepa Belur
(74) *Attorney, Agent, or Firm* — King & Spalding LLP

(57) ABSTRACT

An electrical wiring device includes a receptacle housing comprising alternating current (AC) terminal openings. The electrical wiring device further includes an AC power output terminals disposed within the receptacle housing and aligned with the AC terminal openings. The AC power output terminals are designed to receive prongs of an electrical plug through the AC terminal openings. The electrical wiring device also includes a wireless signal extender circuit disposed within the receptacle housing. The wireless signal extender circuit is configured to receive an incoming wireless signal and to transmit an outgoing wireless signal, where the outgoing wireless signal is generated based on the incoming wireless signal.

20 Claims, 10 Drawing Sheets

(56) References Cited

U.S. PATENT DOCUMENTS

| | | | | |
|---|---|---|---|---|
| 2014/0080415 A1* | 3/2014 | Black | ................... | H04W 80/00 455/41.2 |
| 2014/0132084 A1* | 5/2014 | Pham | ..................... | H01R 24/78 307/140 |
| 2014/0362559 A1* | 12/2014 | Chien | ...................... | H02G 3/14 362/95 |
| 2017/0163045 A1* | 6/2017 | Michaelraj | ............. | H02J 5/005 |

* cited by examiner

WIRING DEVICE WITH INTEGRATED WIRELESS SIGNAL EXTENDER

TECHNICAL FIELD

The present disclosure relates generally to electrical wiring devices and more particularly, to wiring devices with integrated wireless signal extender.

BACKGROUND

Wireless local area networks (WLANs) are widely used in offices and homes. Generally, a WLAN provides network connections between wirelessly networked elements and the internet as well as among the networked elements themselves. For example, a network access point device (e.g., a wireless router) may serve as an interface between an internet service provider and one or more wirelessly networked devices. Thus, a wirelessly networked device such as a computer, a mobile phone, a tablet, etc. may connect to the internet through a network access point device. A network device (e.g., a computer) may also wirelessly connect to another network device (e.g., a printer) via the network access point device.

For a successful communication between the network access point device and the network devices of a WLAN, a wireless signal transmitted by the network access point device needs to reach the network devices with adequate signal power. Similarly, a wireless signal transmitted by a network device needs to reach the network access point device with adequate signal power. However, in some cases, WLAN wireless signals may not have adequate power to be successfully received and processed by the network devices or the network access point device. For example, a computer may be located too far from a wireless router to successfully receive wireless signals from the router. Thus, in some cases, a standalone wireless signal extender (booster) can be used to extend the signal range of wireless signals, for example, of a home or office WLAN. If a WLAN includes multiple network devices that are scattered throughout a home or a building, a relatively high power wireless signal extender or multiple wireless signal extenders may be needed.

However, standalone wireless signal extenders take up space. Further, standalone wireless signal extenders need to be plugged into power outlets that may be needed for other household and office devices. It also may be aesthetically undesirable to use standalone wireless signal extenders in some locations. Thus, it may be desirable to integrate wireless signal extenders into the wiring system of a house or a building.

SUMMARY

In general, the present disclosure relates to a wiring device with integrated wireless signal extender. The wiring device with integrated wireless signal extender provides one or more alternating current (AC) outlets along with a wireless signal (e.g., a Wi-Fi signal) extender/booster integrated therein. In some example embodiments, the integrated wireless signal extender may be a low power wireless signal extender that is designed to extend a wireless network to a relatively small area as compared to standalone wireless signal extenders that are intended to extend a wireless network to a much larger area such as multiple rooms.

In an example embodiment, an electrical wiring device includes a receptacle housing comprising alternating current (AC) terminal openings. The electrical wiring device further includes an AC power output terminals disposed within the receptacle housing and aligned with the AC terminal openings. The AC power output terminals are designed to receive prongs of an electrical plug through the AC terminal openings. The electrical wiring device also includes a wireless signal extender circuit disposed within the receptacle housing. The wireless signal extender circuit is configured to receive an incoming wireless signal and to transmit an outgoing wireless signal, where the outgoing wireless signal is generated based on the incoming wireless signal.

In another example embodiment, an electrical wiring device includes a receptacle housing comprising AC terminal openings. The electrical wiring device further includes an AC power output terminals disposed within the receptacle housing and aligned with the AC terminal openings. The AC power output terminals are designed to receive prongs of an electrical plug through the AC terminal openings. The electrical wiring device also includes a Wi-Fi signal extender circuit disposed within the receptacle housing. The Wi-Fi signal extender circuit is configured to receive an incoming Wi-Fi signal and to transmit an outgoing Wi-Fi signal, where the outgoing Wi-Fi signal is generated based on the incoming Wi-Fi signal.

These and other aspects, objects, features, and embodiments will be apparent from the following description and the claims.

BRIEF DESCRIPTION OF THE DRAWINGS

The foregoing and other features and aspects of the disclosure are best understood with reference to the following description of certain example embodiments, when read in conjunction with the accompanying drawings, wherein:

FIG. 9 is a block diagram illustrating the wiring device with integrated wireless signal extender of FIG. 1 coupled to a switch in accordance with an example embodiment;

Figure 1:
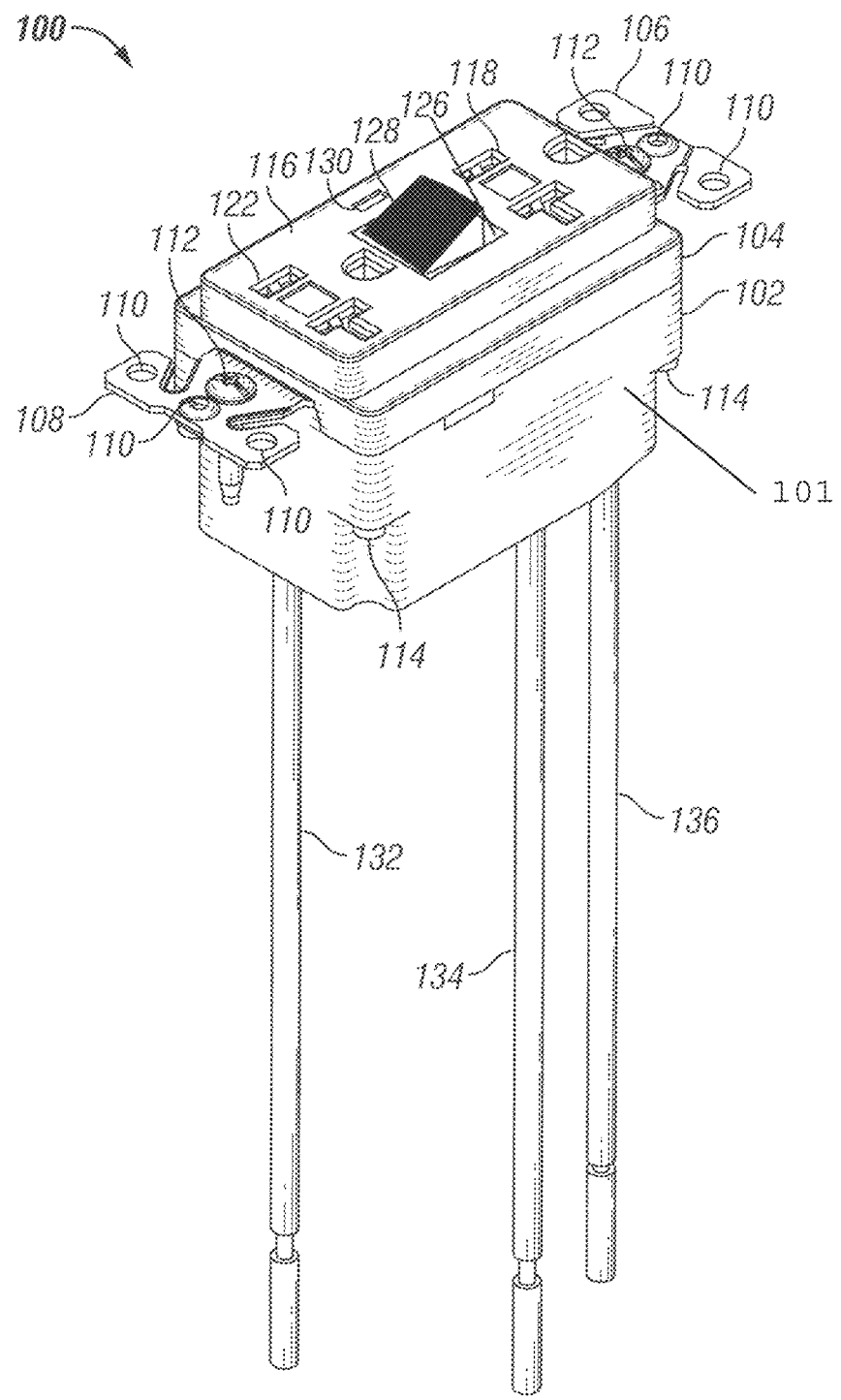
FIG. 1 is a front perspective view of a wiring device with integrated wireless signal extender in accordance with an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the figures, same reference numerals designate like or corresponding, but not necessarily identical, elements.

DETAILED DESCRIPTION OF EXAMPLE EMBODIMENTS

In the following paragraphs, particular embodiments will be described in further detail by way of example with reference to the figures. In the description, well known components, methods, and/or processing techniques are omitted or briefly described. Furthermore, reference to various feature(s) of the embodiments is not to suggest that all embodiments must include the referenced feature(s).

Turning now to the drawings, FIG. 1 is a front perspective view of a wiring device 100 with integrated wireless signal extender in accordance with an example embodiment of the present disclosure. Referring to FIG. 1, the wiring device 100 with integrated wireless signal extender includes a receptacle housing 101 (SHOWN IN FIG. 1), a first coupling band 106, and a second coupling band 108. The receptacle housing 101 includes a main housing 102 and a housing cover 104. A hot wire 132, a neutral wire 134, and a ground wire 136 are coupled to respective contacts inside the wiring device 100.

The main housing 102 is substantially a rectangular shell, and generally houses one or more internal components such as printed circuit boards (PCBs), electronic components, wires, contacts, etc. The main housing 102 is coupled to the housing cover 104 to form the receptacle housing 101 as the external structure of the wiring device 100. In certain example embodiments, the main housing 102 is coupled to the housing cover 104 by one or more screws 114 threaded into holes at respective corners of the main housing 102 and housing cover 104, joining the housing cover 104 and the main housing 102.

As illustrated in FIG. 1, the housing cover 104 may be substantially rectangular shaped, having dimensions corresponding to the dimensions of the main housing 102. The housing cover 104 includes a raised face 116. The face 116 faces away from the main housing 102 and may be exposed and accessible to a user when the wiring device 100 is installed in a wall box (not shown). The housing cover includes AC terminal openings 118, 122, that guide prongs of electrical plugs from external devices (not shown) into the wiring device 100. The AC terminal openings 118, 122 allow electrical plugs of external devices (e.g., a computer, a charger, etc.) to be electrically coupled to the wiring device 100 such that AC power is provided from a building main power connection to the external devices.

The wiring device 100 further includes a switch opening 126 and a switch 128. As illustrated in FIG. 1, the switch 128 may extend through the switch opening 126. Alternatively, the switch 128 may be positioned entirely within the main housing 102 and housing cover 104, and may be accessible by a user through the switch opening 126.

In some example embodiments, as shown in FIG. 1, the wiring device 100 includes a light source 130 that emits light when the switch 128 is closed/turned on. As explained further with respect to FIG. 9, power is provided to a wireless signal extender (shown in FIG. 3) integrated in the wiring device 100 when the switch 128 is closed, and power to the wireless signal extender circuit is discontinued when the switch 128 is open/turned off.

In some example embodiments, the main housing 102 and housing cover 104 are fabricated from a material such as a plastic or polycarbonate material having suitable temperature ratings. Alternatively, one or more of the main housing 102 and the housing cover 104 may be fabricated from a different suitable material that is known to those of ordinary skill in the art.

The first coupling band 106 and the second coupling band 108 allow for coupling of the wiring device 100 to a wall box (not shown). In some example embodiments, the first coupling band 106 and the second coupling band 108 are formed as a single component and have a common middle portion 306 (shown in FIG. 3). In some alternative example embodiments, the first coupling band 106 and the second coupling band 108 may be formed separate from one another. The first and second coupling bands 106, 108 are partially disposed between the main housing 102 and the housing cover 104. As illustrated in FIG. 1, portions of the first coupling band 106 and the second coupling band 108 are disposed outside of the main housing 102 and housing cover 104. One or more apertures 110 are formed on the portions of first and second coupling bands 106, 108 that are disposed outside of the main housing 102 and the housing cover 104. The apertures 110 are used to couple the wiring device 100 to the wall box using fasteners such as screws 112 or other fastening device known to those of ordinary skill in the art.

In some example embodiments, the first coupling band 106 and the second coupling band 108 may be fabricated using a metal, such as steel, or other suitable materials known to those of ordinary skill in the art. In some example embodiments, the outer dimensions of the wiring device 100 with the integrated wireless signal extender comply with building/wiring codes. Although the wiring device 100 with integrated wireless signal extender of FIG. 1 has two sets of AC terminal openings 118, 122, in alternative embodiments, the wiring device 100 may have just one set of AC terminal openings or more than two sets of AC terminal openings. Further, in some alternative example embodiments, the switch opening 126 and the switch 128 may be disposed at a different location on the wiring device 100. In yet other alternative embodiments, the switch 128 and/or the light source 130 may be omitted from the wiring device 100.

Figure 2:
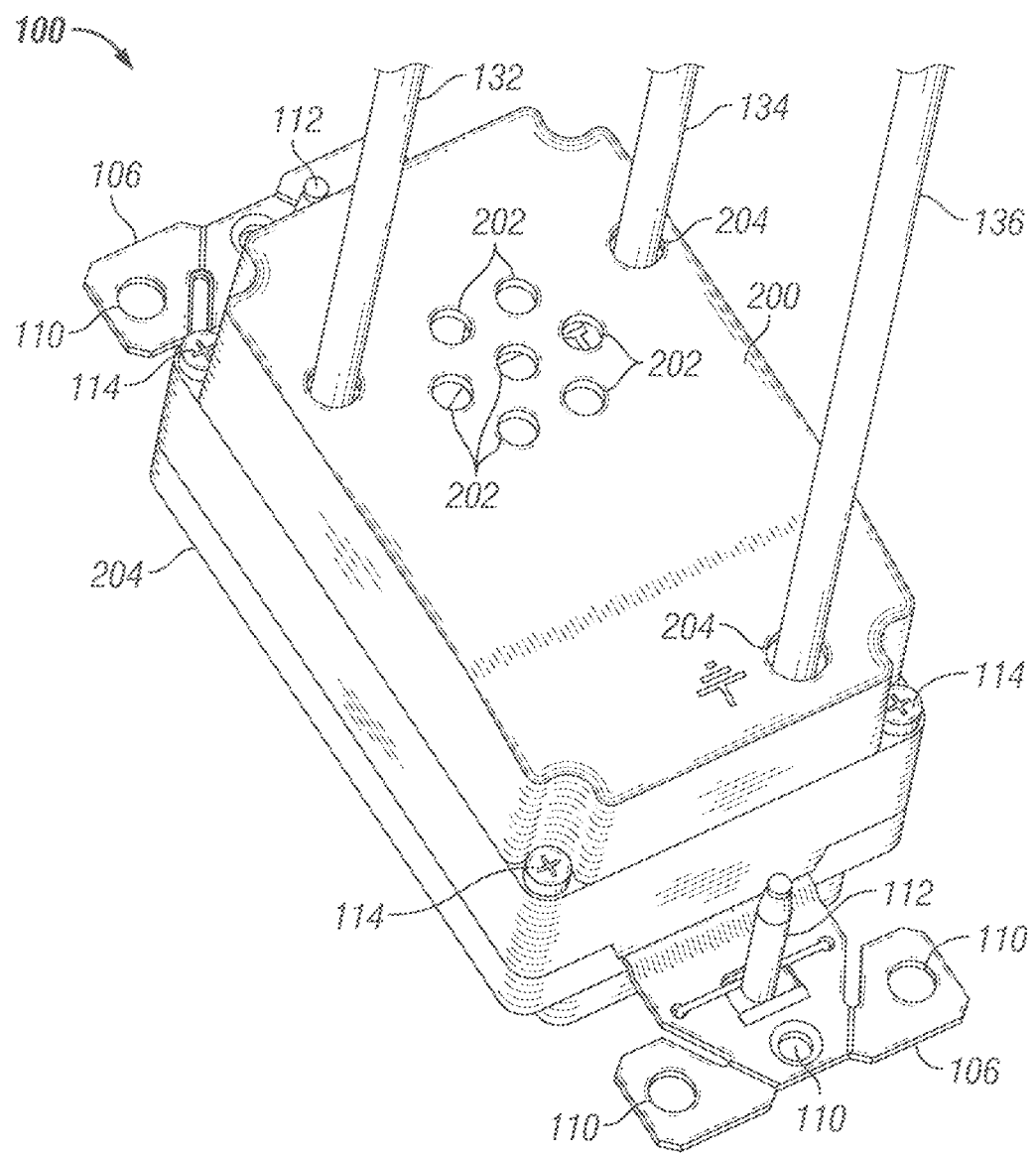
FIG. 2 is a rear perspective view of the wiring device with integrated wireless signal extender of FIG. 1 in accordance with an example embodiment.

FIG. 2 is a rear perspective view of the wiring device 100 with integrated wireless signal extender of FIG. 1 in accordance with an example embodiment. As illustrated in FIG. 2, the main housing 102 includes a back side 200. The back side 200 includes one or more openings 202 that function as vents to allow heat generated inside the wiring device 100 to be dissipated outside of the wiring device 100. In some example embodiments, the openings 202 include allow air to flow between the inside of the wiring device 100 and the environment outside of the wiring device 100.

As illustrated in FIG. 2, the back side 200 of the wiring device 100 further includes wire holes 204, which allow the hot wire 132, the neutral wire 134, and the ground wire 136 to extend therethrough. The hot wire 132, the neutral wire 134, and the ground wire 136 are coupled to respective electrical contacts inside the wiring device 100 to respective building wires outside of the wiring device 100.

Figure 3:
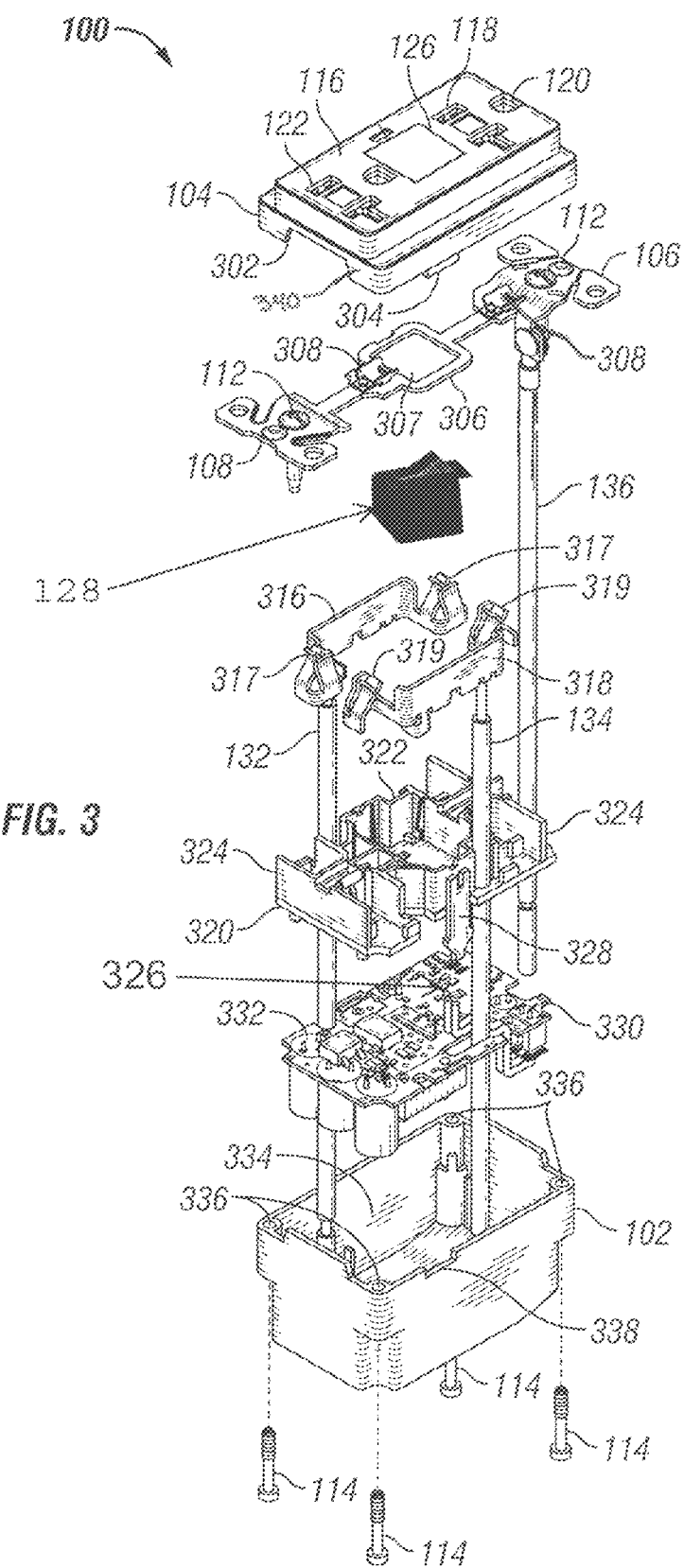
FIG. 3 is an exploded view of the wiring device with integrated wireless signal extender of FIG. 1 in accordance with an example embodiment.

FIG. 3 is an exploded view of the wiring device 100 illustrating internal components in accordance with an example embodiment of this disclosure. As illustrated in FIG. 3, the wiring device 100 includes the switch 128, a hot terminal 316, a neutral terminal 318, a midframe 320, and a printed circuit board (PCB) 330 including a wireless signal extender circuit 326 and a power conversion circuit 332. As illustrated in FIG. 3, the housing cover 104 further includes one or more cutouts 302 at one or more respective ends 340 of the housing cover 104. The one or more cutouts 302 provide space between the housing cover 104 and the main housing 102 that allow the first and second coupling bands 106, 108 to extend outside of the main housing 102 when the housing cover 104 is coupled to the main housing 102.

In some example embodiments, the housing cover 104 also includes a tab 304 extending out from an edge of the housing cover 104. The tab 304 is designed to be disposed in a notch 338 formed in a corresponding edge of the main housing 102, which facilitates proper alignment of the housing cover 104 to the main housing 102 when the housing cover 104 and main housing 102 are assembled together.

As illustrated in FIG. 3, the first coupling band 106 is coupled to the second coupling band 108 via the middle portion 306. In some example embodiments, the middle portion 306 includes an opening 307 positioned in the middle portion 306. The opening 307 allows the switch 128 to be disposed therethrough. The first and second coupling bands 106, 108 also are electrically coupled to the ground wire 136. Furthermore, the first coupling band 106 and the second coupling band 108 include a respective ground terminal slot 308, which receives and conductively couples a ground prong of an electrical plug to the ground wire 136 when the electrical plug is plugged into the first or second AC terminal openings 118, 122.

In some example embodiments, the hot terminal 316 is electrically coupled to the hot wire 132, and the neutral terminal 318 is electrically coupled to the neutral wire 134. The hot terminal 316 includes two hot contacts 317 disposed at opposite ends of the hot terminal 316. Each of the hot contacts 317 includes a spring biased contact mechanism for receiving, gripping, and electrically coupling to a hot prong of an electrical plug that is plugged into the first or second AC terminal openings 118, 122 of the wiring device 100. Similarly, the neutral terminal 318 includes two neutral contacts 319 disposed at opposite ends of the neutral terminal 318. Each of the neutral contacts 319 includes a spring biased contact mechanism for receiving, gripping, and electrically coupling to a neutral prong of an electrical plug that is plugged into the first or second AC terminal openings 118, 122 of the wiring device 100. Each of the hot contacts 317 and the neutral contacts 319 are aligned with respective openings of the first and second terminal openings 118, 122 when the wiring device 100 is assembled as illustrated in FIG. 1. Thus, when an electrical plug of an external device is inserted into first or second AC terminal openings 118, 122, electrical power is provided to the external device.

The midframe 320 provides structural support for the hot terminal 316, the neutral terminal 318, and the first and second coupling bands 106, 108. As illustrated in FIG. 3, the midframe 320 is disposed over the PCB 330 and around at least a portion of the switch 128 when the switch 128, the PCB 330 and the midframe 320 are assembled together. The midframe 320 includes one or more side clips 328, which clip onto one or more sides of the PCB 330 and hold the PCB 330 adjacent to the midframe 320. In some example embodiments, the midframe 320 is fabricated from a polycarbonate grade capable of withstanding the heat generated by the components of the PCB 330 and other components of the wiring device 100. In some alternative example embodiments, the midframe 320 may be fabricated from a glass-filled nylon. In some example embodiments, the PCB 330 includes areas of copper plates disposed thereon for increased heat dissipation. Additionally, the PCB 330 may be fabricated from a 2 ounce copper board for additional heat dissipation.

As illustrated in FIG. 3, the main housing 102 includes walls 334 and holes 336. The holes 336 are used for attachment of screws 114. The screws 114 are partially screwed into the holes 336 of the main housing 102 and into corresponding holes of housing cover 104 to couple the main housing 102 to the housing cover 104. Generally, the PCB 330, the midframe 320, the hot terminal 316, the neutral terminal 318, and the switch 128 are disposed inside the main housing 102 when the wiring device 100 is fully assembled as illustrated in FIG. 1.

Figure 4:
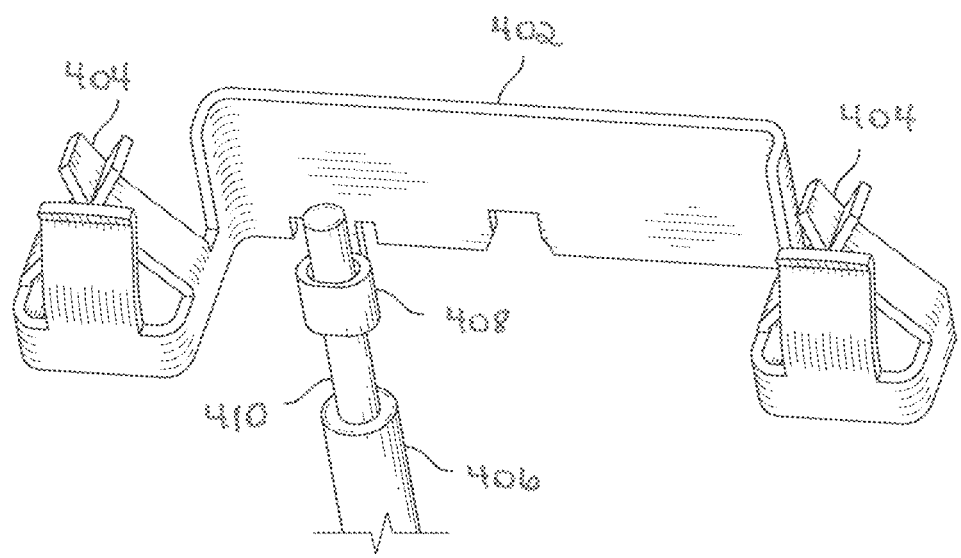
FIG. 4 is a perspective view of a representative contact terminal of the wiring device with integrated wireless signal extender of FIG. 3 in accordance with an example embodiment.

FIG. 4 is a perspective view of a terminal 402 that is representative of each of the hot and neutral terminals 316, 318 shown in FIG. 3. The terminal 402 includes two contacts 404. The two contacts 404 represent the two hot contacts 317 and the two neutral contacts 319. The terminal 402 is coupled to wire 406 that corresponds the hot and neutral wires 132, 134 shown in FIG. 3. The wire 406 is coupled to the terminal 402 via a crimp 408 that forms an electrical connection between the wire 406 and the terminal 402. The crimp 408 is generally clamped around an exposed conductive core 410 of the wire 406. In some example embodiments, the crimp 408 may also be soldered to the exposed core 410. The terminal 402 may be fabricated from a conductive material such as a copper alloy or any other suitable metal. In certain example embodiments, the terminal 402 may be fabricated from a copper alloy including about 90% copper, 8% zinc, and 2% other materials.

Figure 5:
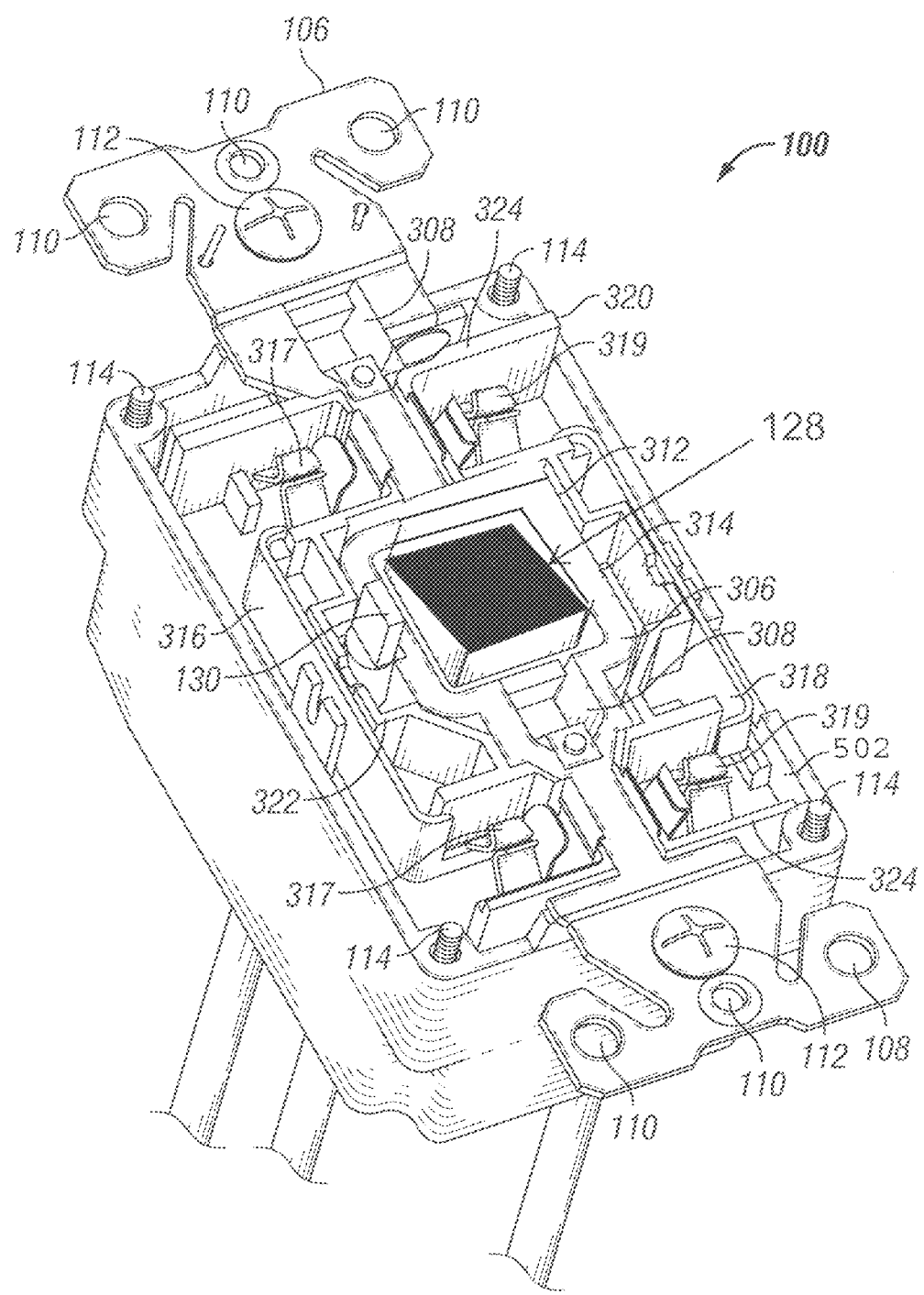
FIG. 5 is a perspective view of a partially assembled wiring device with integrated wireless signal extender of FIG. 1 in accordance with an example embodiment.

FIG. 5 is a perspective view of a partially assembled wiring device 100. Relative to FIG. 1, in FIG. 5, the housing cover 104 has not been attached to the main housing 102. The main housing 102 includes a cavity 502 formed therein for receiving the internal components of the wiring device 100. The cavity 502 is substantially rectangular, although the cavity 502 may have a different shape in other example embodiments. The midframe 320 is similarly rectangular shaped as the cavity 502 and generally fits within the cavity 502 such that the midframe 320 is essentially fixed with respect to the main housing 102. Inner walls 322 and outer walls 324 of the midframe 320 separate the hot terminal 316 and the neutral terminal 318 as well as the switch 128. The first coupling band 106, the second coupling band 108, and the common middle portion 306 are at least partially disposed on the midframe 320. Specifically, the middle portion 306 is disposed around the switch 128 and between the inner walls 322 of the midframe 320. The middle portion 306 is separated from both the hot terminal 316 and the neutral terminal 318 by the inner walls 322. The light source 130 is electrically coupled to the switch 128 and is designed to emit light when the switch 128 is turned on to provide power to the wireless signal extender circuit 326 shown in FIG. 3. In some example embodiments, the light source 130 is a light emitting diode ("LED"). Alternatively, the light source 130 may be a light source other than an LED that is designed to emit light.

Figure 6:
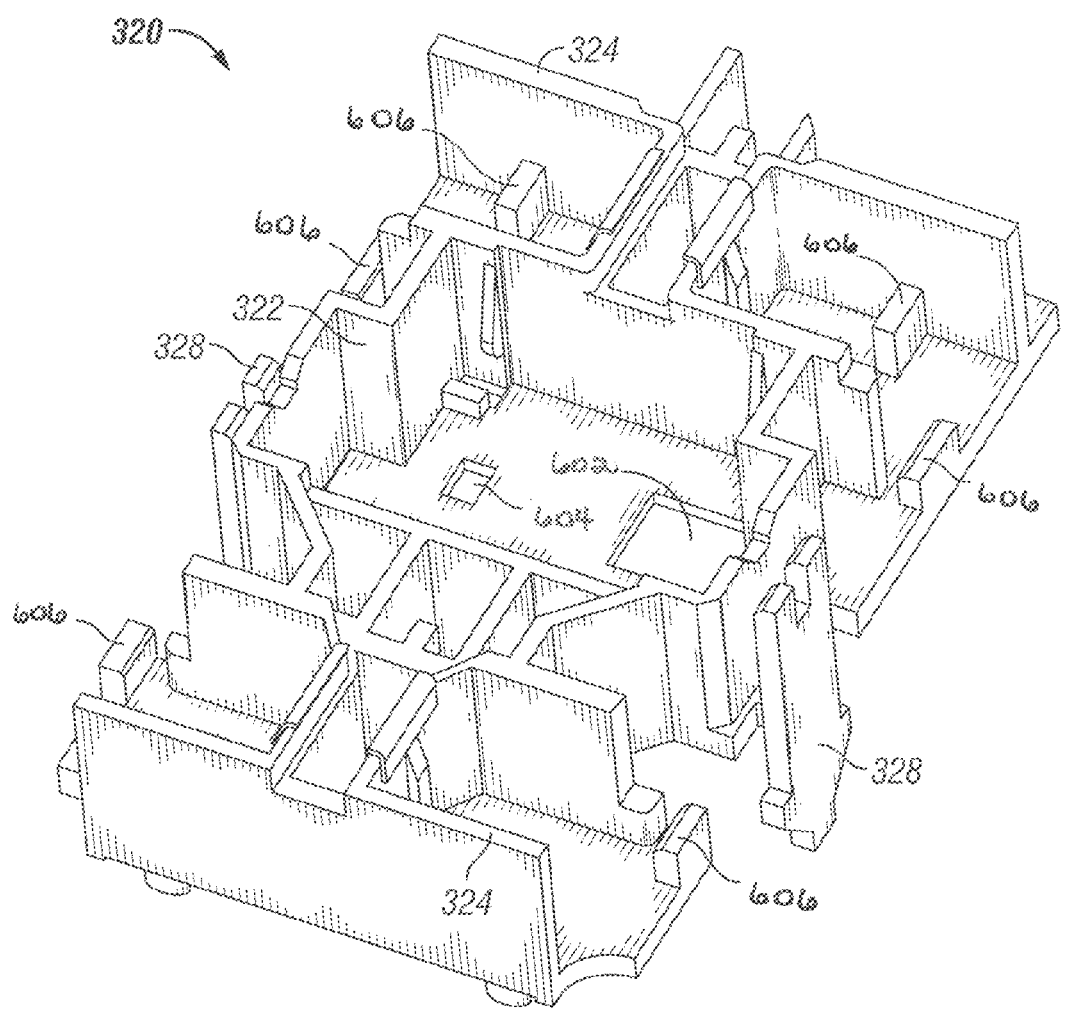
FIG. 6 is a perspective view of a midframe of the wiring device with integrated wireless signal extender of FIG. 1 in accordance with an example embodiment.

FIG. 6 illustrates a perspective view of the midframe 320 in accordance with an example embodiment. Referring to FIG. 6, the midframe 320 includes inner walls 322 and the outer walls 324 that keep the terminals 316, 318 shown in FIG. 3 separated from each other and from the coupling bands 106, 108 and also keep the terminals 316, 318 in their respective positions when the wiring device 100 is assembled. Further, in some example embodiments, the midframe 320 includes a first opening 602 and a second opening 604. For example, the second opening 604 may allow for the light source 130 (e.g., a light tube) to extend through the midframe 130. The first opening 602 may be used to route electrical wires/connections, for example, between the switch 128 and the PCB 330. The midframe 320 further includes a plurality of ledges 606. The ledges 606 along with the walls 322, 324 help keep the terminals 316, 318 in place when the wiring device 100 is assembled. Although FIG. 6 illustrates a particular design of the midframe 320, in alternative embodiments, the midframe 130 may have a different design without departing from the scope of this disclosure. For example, in alternative embodiments, the midframe 320 may have fewer or more inner walls 322, outer walls 324, openings 602, 604, and ledges 606 than shown in FIG. 6.

Figure 7:
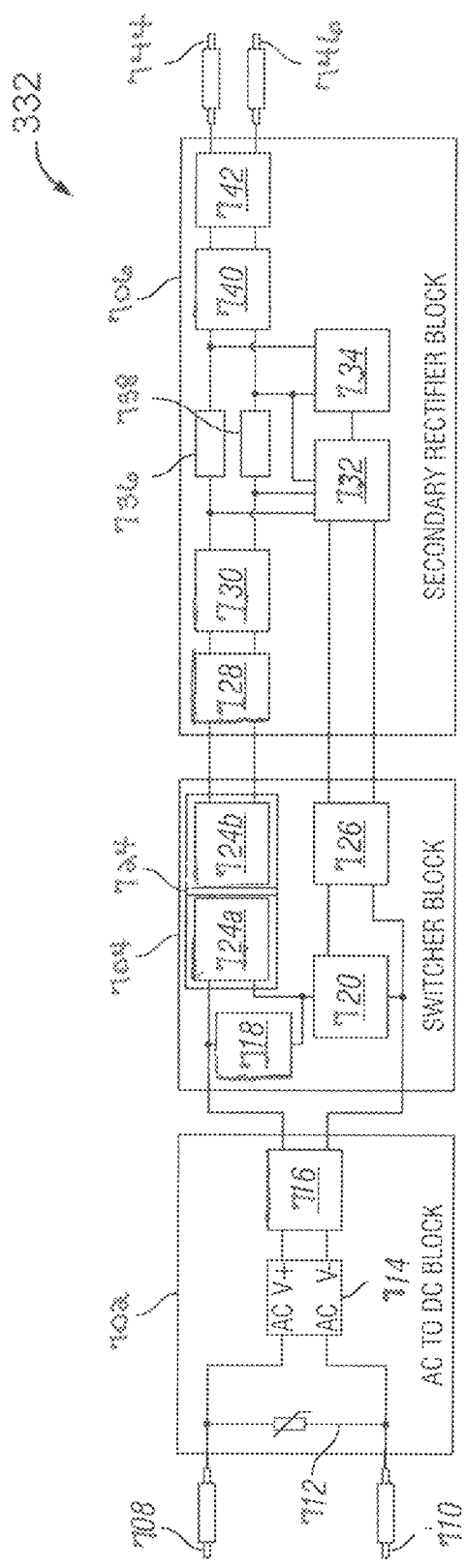
FIG. 7 is a block diagram of a power conversion circuit of the wiring device with integrated wireless signal extender of FIG. 1 in accordance with an example embodiment.
Figure 8:
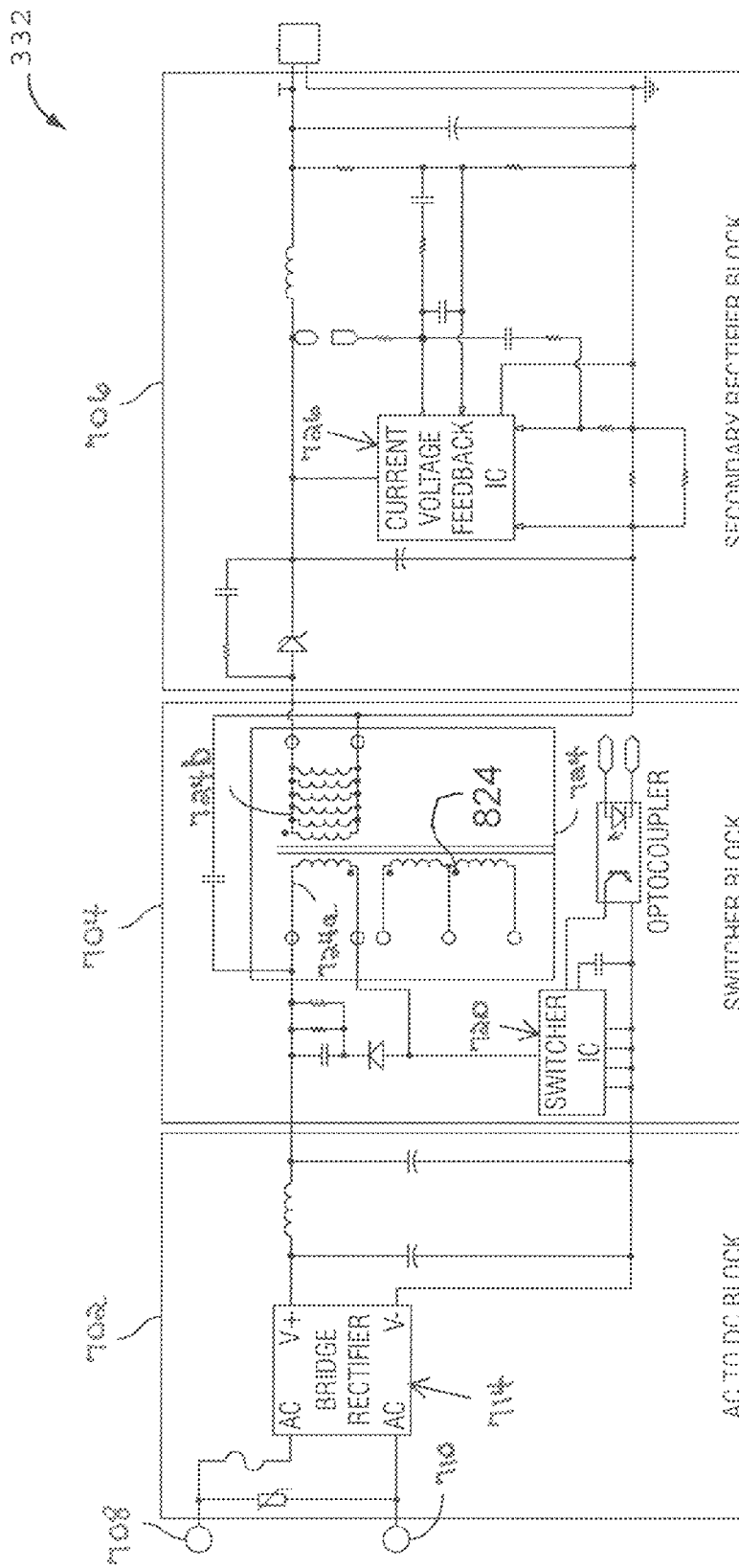
FIG. 8 is a schematic diagram of the power conversion circuit of FIG. 8 in accordance with an example embodiment.

FIG. 7 is a block diagram of the power conversion circuit 332 in accordance with an example embodiment. FIG. 8 is a schematic diagram illustrating details of the block diagram of the power conversion circuit 332 of FIG. 7 in accordance with an example embodiment. Specifically, FIG. 8 illustrates an example configuration of electrical components used to implement the function of the power conversion circuit 332 as illustrated by the block diagram of FIG. 7. Referring to FIGS. 7 and 8, the power conversion circuit 332 includes an AC/DC conversion block 702, a switcher block 704, and a secondary rectifier block 706. The AC/DC conversion block 702 is coupled to a hot terminal 708 and a neutral terminal 710, which are electrically respectively coupled to the hot and neutral wires 132, 134 shown in FIG. 3.

Referring to FIG. 7, in some example embodiments, the AC/DC conversion block 702 includes a surge suppressor 712, a bridge rectifier 714, and a DC filter 716. As illustrated, the surge suppressor 712 is coupled between the hot and neutral wires 708, 710 that are respectively coupled to the hot wire 132 and the neutral wire 134 shown in FIG. 3. The surge suppressor 712 protects the circuit from voltage surges that could potentially harm the circuit. The bridge rectifier 714 converts the received AC power received via the hot terminal 708 and the neutral terminal 710 into high DC voltage of, for example, approximately 170 V. The DC filter 716 receives the DC voltage from the bridge rectifier 714 and smoothes the DC voltage into a smoother high DC voltage. The DC filter 716 of the AC/DC conversion block 702 is coupled to the switcher block 704.

The switcher block 704 converts the smoother high DC voltage from the AC/DC conversion block 702 into an isolated low voltage DC output that is provided to the secondary rectifier block 706. In some example embodiments, the switcher block 704 converts the high DC voltage into approximately 5 volts DC. Alternatively, the switcher block 704 may convert the high DC voltage into a relatively low isolated DC voltage ranging from 5 volts to 25 volts. In yet other embodiments, the switcher block 704 may convert the high DC voltage into a relatively low isolated DC voltage that is less than from 5 volts or higher than 25 volts.

In some example embodiments, the switcher block 704 includes a snubber circuit 718, a switcher integrated circuit (IC) 720, a transformer 724, and a current voltage feedback optocoupler 726. The switcher IC 720 functions as a power supply controller. In certain example embodiments, the switch IC 720 includes a field effect transistor ("FET") having a relatively low on-resistance that allows for higher efficiency resulting in enhanced power management. The snubber circuit 718 reduces or eliminates potentially damaging high voltage spikes in the DC voltage from the AC/DC conversion block 702. The transformer 724 steps down the received DC voltage into the relatively low voltage DC output (e.g., 5 to 25 volts). As illustrated in FIG. 7, the transformer 724 includes a primary side 724a and a secondary side 724b.

In some example embodiments, the windings of the secondary side 724b of the transformer 724 is made of litz wire, which includes many (e.g., 120) strands of thin wire twisted or woven together to form the winding. The litz wire generally performs better at high frequencies and has lower resistance, which further enhances power efficiency of the power conversion circuit 332. As illustrated in FIG. 8, the transformer 724 may also include one or more shielding windings 824 that may reduce or suppress electromagnetic interference.

In some example embodiments, the secondary rectifier block 706 includes a rectifier diode 728, a first DC filter 730, an RF choke 736, a current shunt 738, a current voltage feedback IC 732, voltage feedback component 734, a second DC filter 740, and a DC connector 742. The rectifier diode 728, the first DC filter 730, the RF choke 736, the current shunt 738, and the second DC filter 740 work to further rectify, smooth, filter, or otherwise condition the low DC voltage output from the switcher block 704. The conditioned low voltage DC output is then received by the DC connector 742 that is coupled to a hot wire 744 and a neutral wire 746 for delivering the low voltage DC output to the wireless signal extender circuit 326 shown in FIGS. 3 and 9. In some example embodiments, the hot wire 744 and the neutral wire 746 may be included in a header style connector (not shown). In alternative embodiments, the power conversion circuit 332 may be implemented using components and connections different from some or all of the components shown in FIGS. 7 and 8.

FIG. 9 is a block diagram illustrating the wireless signal extender circuit 326 coupled to a switch 128 in accordance with an example embodiment. Referring to FIGS. 8 and 9, the hot wire 744 from the power conversion circuit 332 may be electrically coupled to the wireless signal extender circuit 326 and to the light source 130 through the switch 128. To illustrate, the hot wire 744 is electrically coupled to the wireless signal extender circuit 326 and light source 130 when the switch 128 is closed/turned on, and the hot wire 744 is electrically decoupled from the wireless signal extender circuit 326 and from light source 130 when the switch 128 is open/turned off. As illustrated in FIG. 9, the neutral wire 746 may be directly coupled to the wireless signal extender circuit 326 and light source 130. The light source 130 emits light when the switch 128 is turned on, indicating that power is being supplied to the wireless signal extender circuit 326.

Although the switch 128 is coupled to the hot wire 744 in FIG. 9, in alternative embodiments, the switch 128 may instead be coupled to the neutral wire 746 or to another component or wire to control whether power is provided to the wireless signal extender circuit 326 and to the light source 130. Further, in some alternative embodiments, the switch 128 and/or the light source 130 may be omitted from the wiring device 100.

When power is supplied to the wireless signal extender circuit 326 as described above, the wireless signal extender circuit 326 may receive an incoming wireless signal, for example, from a WLAN (e.g., a Wi-Fi network) router or a network device (e.g., a computer) and generate and transmit an outgoing wireless signal based on the incoming wireless signal. For example, an incoming wireless signal from a network access point device (e.g., a Wi-Fi router) may not have adequate signal power to be successfully received and processed by a wireless network device such as a computer (shown in FIG. 11). However, the wireless signal extender circuit 326 may generate and transmit the outgoing wireless signal such that the outgoing wireless signal has adequate signal power to be successfully received and processed by the network device.

In some example embodiments, the wireless signal extender circuit 326 may be a Wi-Fi signal extender circuit that receives an incoming Wi-Fi signal and transmits an outgoing Wi-Fi signal. For example, the wireless signal extender circuit 326 may be compatible with one or more of IEEE 802.11 standards. To illustrate, the wireless signal extender circuit 326 may be compatible with one or more of 802.11a, 802.11b, 802.11g, and 802.11n, and the incoming wireless signal and the outgoing wireless signal may be 802.11a, 802.11b, 802.11g, or 802.11n signals.

Figure 10:
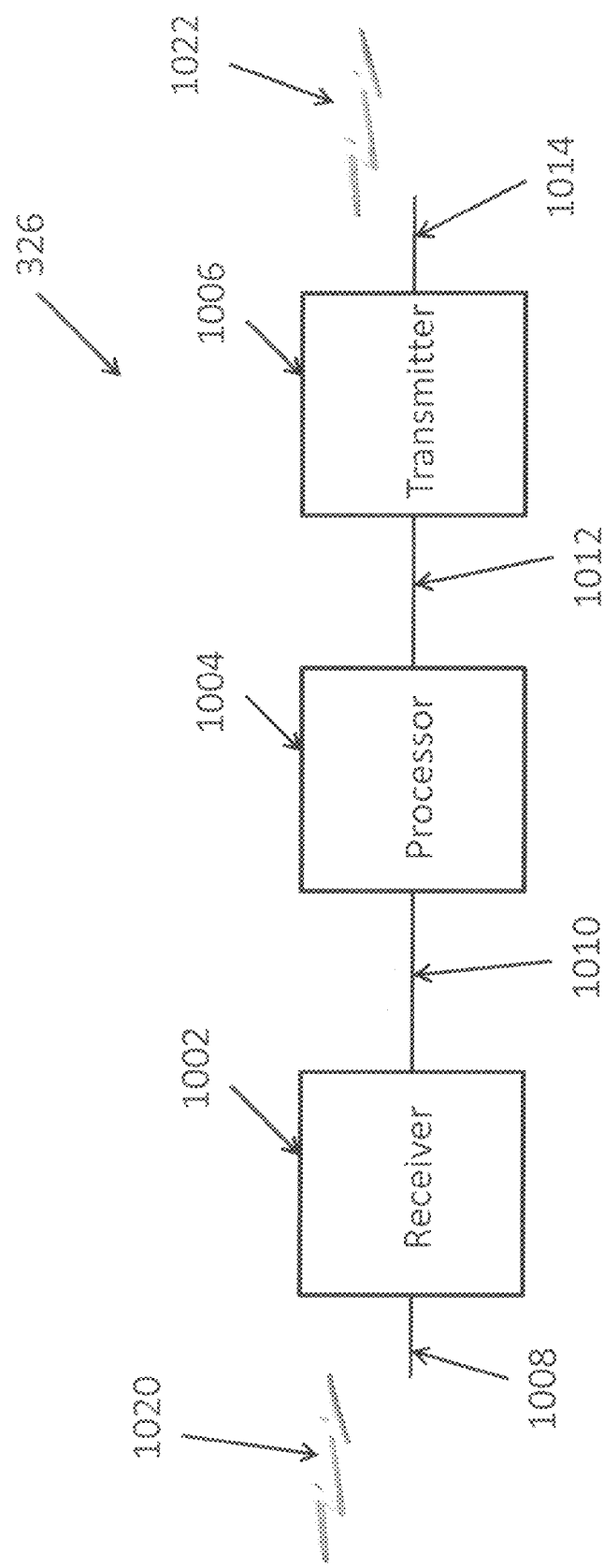
FIG. 10 is a block diagram of the integrated wireless signal extender of the wiring device of FIG. 1 in accordance with an example embodiment.

FIG. 10 is a block diagram of the wireless signal extender circuit 326 of the wiring device 100 of FIG. 1 in accordance with an example embodiment. As illustrated in FIG. 10, in some example embodiments, the wireless signal extender circuit 326 includes a receiver 1002, a processor 1004, and a transmitter 1006. The receiver 1002 is configured to receive an incoming wireless signal 1020, for example, from a network access point device (shown in FIG. 11) such as a wireless network router. For example, the incoming wireless signal 1020 may be an 802.11a, 802.11b, 802.11g, or 802.11n signal. The receiver 1002 may receive the signal 1020, for example, via an antenna 1008, which may be an electrical wire.

In some example embodiments, the receiver 1002 transfers a signal corresponding to the signal 1020 to a processor 1004 via a connection 1010. For example, the receiver 1002 may process the signal 1020 and transfer another signal (for example, amplified and filtered version of the signal 1020) to the processor 1004. The processor 1004 then generates an output signal based on the signal from the receiver 1002 that corresponds to the incoming signal 1020. The processor 1004 may then provide the output signal corresponding to the incoming wireless signal 1020 to the transmitter 1006 via a connection 1012. The transmitter 1006 transmits an outgoing wireless signal 1022 based on the output signal from the processor 1004, for example, via an antenna 1014, which may be a wire. For example, the outgoing wireless signal 1022 may be 802.11a, 802.11b, 802.11g, or 802.11n signal.

Figure 11:
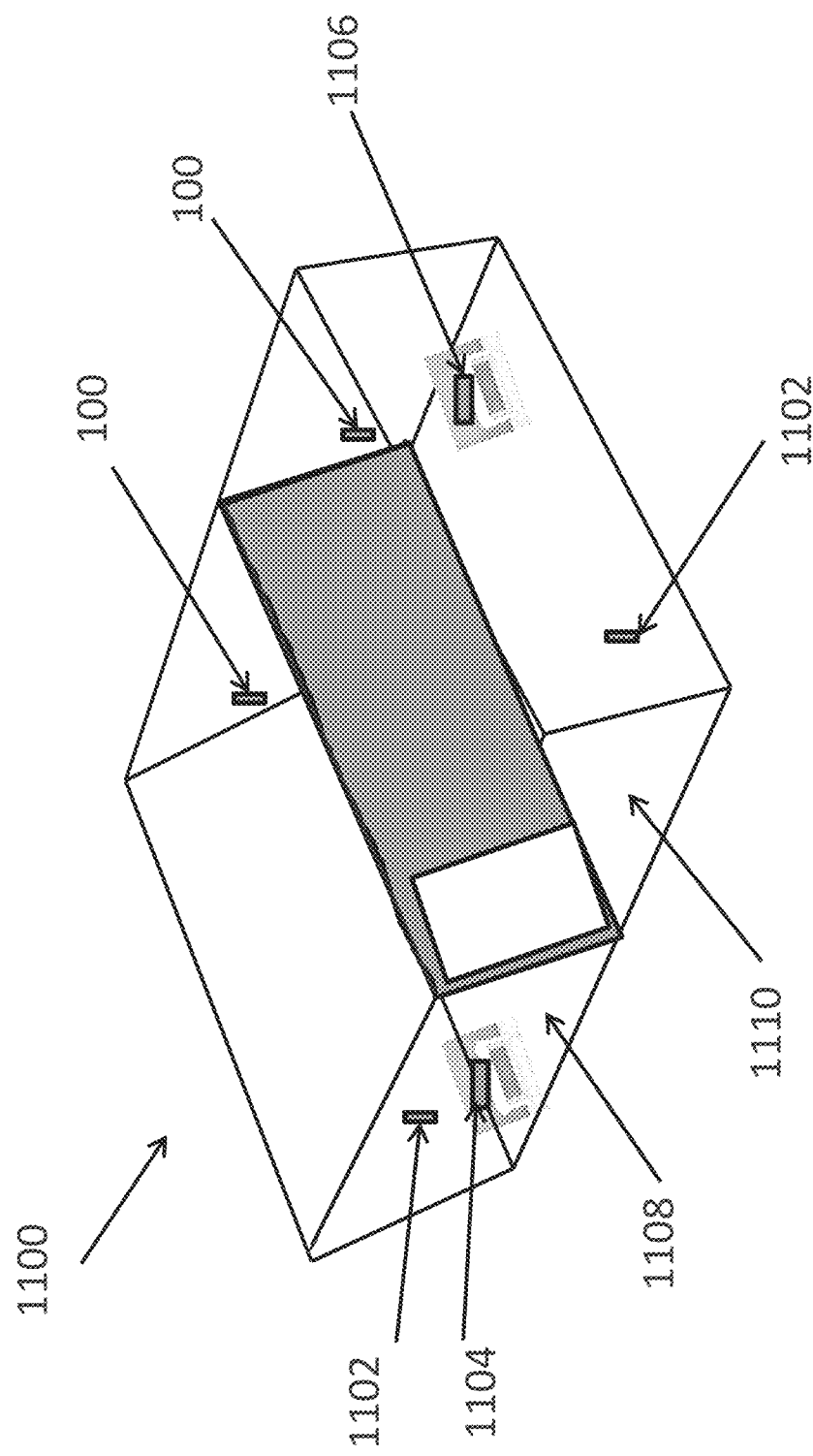
FIG. 11 is a diagram illustrating installed wiring devices with integrated wireless signal extender of FIG. 1 in accordance with an example embodiment.

The transmitter 1006 may transmit the outgoing wireless signal 1022 such that the outgoing wireless signal 1022 can be successfully received and processed by a wireless network device (e.g., a computer) shown in FIG. 11. For example, the outgoing wireless signal 1022 may have adequate signal power to be successfully received and processed by a wireless network device within a certain distance (e.g., up to 10 feet, 20 feet, 30 feet, etc.) from the wiring device 100 with the wireless signal extender that includes the wireless signal extender circuit 326. Thus, by generating and transmitting the outgoing wireless signal 1022 based on the incoming wireless signal 1020, the wireless signal extender circuit 326 effectively extends the incoming wireless signal 1020 beyond the original reach of the incoming wireless signal 1020.

The receiver 1002, the processor 1004, and the transmitter 1006 operate using the DC power provided by the power conversion circuit 332 described with respect to FIGS. 7 and 8. In general, the signal power of the outgoing signal 1022 transmitted by the transmitter 1022 depends on the DC voltage level provided by the power conversion circuit 332.

In some example embodiments, the processor 1004 may be implemented using one or more integrated circuits (ICs), discrete electrical components, and/or a combination thereof. For example, the processor 1004 may include or may be electrically coupled to one or more memory devices (not shown) for storing data or software code to be executed by a central processor unit (not shown) in the processor 1004 in a manner known to those of ordinary skill in the art.

FIG. 11 is a diagram illustrating a building 1100 including installed wiring devices 100 with integrated wireless signal extender of FIG. 1 in accordance with an example embodiment. As illustrated in FIG. 11, the building 1100 include two rooms 1108, 1110. A wireless router (i.e., a network access point device) 1104 is located in the room 1108. For example, the router 1104 may be plugged into an ordinary AC power outlet/receptacle 1102 installed in a wall of the room 1108. A respective wiring device 100 with integrated wireless signal extender may be installed in the walls of each of the rooms 1108, 1110. In some example embodiments, because the router 1104 and a wireless network device (e.g., a computer) 1106 may be far from each other, the wireless network device 1106 may be unable to directly communicate with the router 1104, for example, to access the internet through the router 1104. However, because the wireless device 100 with the wireless signal extender is installed in the wall of the room 1110, the network device 1106 can access the internet through the wireless device 100, which is in communication with the router 1104. In some example embodiments, because the wiring device 100 with the wireless signal extender is intended to extend a wireless signal into a relatively small area (e.g., a single room or a portion of a room), the wiring device 100 with the wireless signal extender may receive incoming wireless signal from the router 1104 and generate a relatively low power outgoing wireless signal that has adequate signal power to be successfully received and processed by the network device 1106.

As illustrated in FIG. 11, only one of the wiring devices installed in each room 1008, 1110 is the wiring device 100 with the wireless signal extender. The other wiring devices (i.e., the AC power outlet/receptacles 1102) that are installed in the walls of the rooms 1108, 1110 are standard power outlets/receptacles that do not include a wireless signal extender. In alternative embodiments, some rooms or hallways may have more than one installed wiring device 100 while other rooms may have only standard power outlets/receptacles that do not include a wireless signal extender. The wiring device 100 with the wireless signal extender can be installed as a replacement in new buildings and home instead of some of the standard AC power outlet/receptacles 1102 without requiring additional installation effort. Further, because the wiring device 100 with the wireless signal extender can be sized to comply with building/wiring codes, the wiring device 100 with the wireless signal extender may be used as a replacement to existing AC power outlet/receptacles 1102, and avoid the need for a standalone wireless signal extender.

Although each example embodiment has been described in detail, it is to be construed that any features and modifications that are applicable to one embodiment are also applicable to the other embodiments. Furthermore, although the disclosure has been described with reference to specific embodiments, these descriptions are not meant to be construed in a limiting sense. Various modifications of the disclosed embodiments, as well as alternative embodiments of the disclosure will become apparent to persons of ordinary skill in the art upon reference to the description of the example embodiments. It should be appreciated by those of ordinary skill in the art that the conception and the specific embodiments disclosed may be readily utilized as a basis for modifying or designing other structures or methods for carrying out the same purposes of the disclosure. It should also be realized by those of ordinary skill in the art that such equivalent constructions do not depart from the spirit and scope of the disclosure as set forth in the appended claims. It is therefore, contemplated that the claims will cover any such modifications or embodiments that fall within the scope of the disclosure.

What is claimed is:

1. An electrical wiring receptacle device that provides electrical power to an electrical plug and for installation in a wall, the electrical wiring receptacle device comprising:
   a receptacle housing comprising alternating current (AC) terminal openings;
   AC power output terminals disposed within the receptacle housing and aligned with the AC terminal openings, wherein the AC power output terminals are designed to receive prongs of the electrical plug through the AC terminal openings and wherein the AC power output terminals are positioned to make contact with the prongs of the electrical plug;
   a midframe disposed within the receptacle housing, wherein the midframe retains the AC power output terminals separated from each other;
   a wireless signal extender circuit formed on a printed circuit board (PCB) disposed within the receptacle housing between the midframe and a back wall of the receptacle housing, wherein the midframe is positioned between the AC power terminals and the PCB, wherein the wireless signal extender circuit is configured to receive an incoming wireless signal and to transmit an outgoing wireless signal generated from the incoming wireless signal; and
   a switch disposed between walls of the midframe, wherein the switch is positioned between a first pair of the AC terminal openings and a second pair of the AC terminal openings, wherein the midframe is positioned between the PCB and the switch, and wherein the switch is used to connect and disconnect electrical power to the wireless signal extender circuit.

2. The electrical wiring receptacle device of claim 1, wherein the receptacle housing comprises a switch opening and wherein the switch is at least partially disposed outside of the receptacle housing through the switch opening.

3. The electrical wiring receptacle device of claim 1, further comprising a power conversion circuit disposed within the receptacle housing, wherein the power conversion circuit is configured to convert AC power to direct current (DC) power and wherein the wireless signal extender circuit operates on the DC power.

4. The electrical wiring receptacle device of claim 1, further comprising a light source disposed within the receptacle housing, wherein the light source is configured to emit light when the electrical power is provided to the wireless signal extender circuit.

5. The electrical wiring receptacle device of claim 4, wherein the light source is a light emitting diode.

6. The electrical wiring receptacle device of claim 1, wherein the receptacle housing comprises a back side, the back side forming one or more openings for dissipating heat.

7. An electrical wiring receptacle device that provides electrical power to an electrical plug and for installation in a wall, the electrical wiring receptacle device comprising:
   a receptacle housing comprising alternating current (AC) terminal openings;
   AC power output terminals disposed within the receptacle housing and aligned with the AC terminal openings, wherein the AC power output terminals are designed to receive prongs of the electrical plug through the AC terminal openings, wherein the AC power output terminals are positioned to make contact with the prongs of the electrical plug, and wherein electrical wires extend through one or more openings in a back wall of the receptacle housing and are electrically coupled to the AC power output terminals inside the receptacle housing;
   a midframe disposed within the receptacle housing;
   a Wi-Fi signal extender circuit disposed within the receptacle housing between the midframe and the back wall of the receptacle housing, wherein the midframe is disposed between the AC power output terminals and the Wi-Fi signal extender circuit, wherein the Wi-Fi signal extender circuit is configured to receive an incoming Wi-Fi signal and to transmit an outgoing Wi-Fi signal generated from the incoming Wi-Fi signal; and
   a switch disposed on the midframe, wherein the switch is positioned between a first pair of the AC terminal openings and a second pair of the AC terminal openings and wherein the switch is used to connect and disconnect electrical power to the Wi-Fi signal extender circuit.

8. The electrical wiring receptacle device of claim 7, wherein the receptacle housing comprises a switch opening and wherein the switch is at least partially disposed outside of the receptacle housing through the switch opening.

9. The electrical wiring receptacle device of claim 7, further comprising a power conversion circuit disposed within the receptacle housing, wherein the power conversion circuit is configured to convert AC power to direct current (DC) power and wherein the Wi-Fi signal extender circuit operates on the DC power.

10. The electrical wiring receptacle device of claim 9, wherein the power conversion circuit comprises an AC/DC conversion element, a switcher element, and a secondary rectifier element.

11. The electrical wiring receptacle device of claim 7, further comprising a light source disposed within the receptacle housing, wherein the light source is configured to emit light when the electrical power is provided to the Wi-Fi signal extender circuit.

12. The electrical wiring receptacle device of claim 7, wherein the AC power output terminals are configured to output AC power having at least a 120 volt, 15 ampere rating.

13. The electrical wiring receptacle device of claim 1, wherein the midframe includes a first opening for routing one or more electrical wires between the switch and the PCB.

14. The electrical wiring receptacle device of claim 13, wherein the midframe includes a second opening for extending a light source from the PCB through the midframe.

15. The electrical wiring receptacle device of claim 13, wherein the midframe includes one or more clips used to attach the midframe to the PCB.

16. The electrical wiring receptacle device of claim 1, wherein a first coupling band and a second coupling band are disposed on opposite sides of the electrical wiring receptacle device and are used for coupling of the electrical wiring receptacle device to a wall box and wherein the switch extends through an opening in a middle section that couples the first coupling band to the second coupling band.

17. The electrical wiring receptacle device of claim 7, wherein the midframe is positioned between the Wi-Fi signal extender circuit and the switch.

18. The electrical wiring receptacle device of claim 17, wherein the midframe includes a first opening for routing one or more electrical wires between the switch and the Wi-Fi signal extender circuit.

19. The electrical wiring receptacle device of claim 18, wherein the midframe includes a second opening for extending a light source from the PCB through the midframe.

20. The electrical wiring receptacle device of claim 18, wherein the midframe includes one or more clips used to attach the midframe to the PCB.

* * * * *